United States Patent [19]

Bosyj et al.

[11] Patent Number: 5,373,606
[45] Date of Patent: Dec. 20, 1994

[54] ACCESSORY STORAGE FOR A VACUUM CLEANER

[75] Inventors: Nick M. Bosyj; David W. Moine, both of North Canton, Ohio

[73] Assignee: The Hoover Company, North Canton, Ohio

[21] Appl. No.: 89,323

[22] Filed: Jul. 12, 1993

[51] Int. Cl.$^5$ .......................... B60B 33/00; A47L 9/00
[52] U.S. Cl. ...................... 15/323; 16/18 R; 211/70.6
[58] Field of Search ............ 15/323; 16/18 R, 18 CG; 211/70.6; 248/89

[56] References Cited

U.S. PATENT DOCUMENTS

| | | | |
|---|---|---|---|
| D. 213,640 | 3/1969 | Mariol | D7/6 |
| D. 286,336 | 10/1986 | Berfield et al. | D32/23 |
| 1,200,954 | 10/1916 | Lawlor | |
| 1,709,972 | 4/1929 | Dibsdale | |
| 2,537,719 | 1/1951 | Tuepker | 174/45 |
| 2,621,357 | 12/1952 | Stuman | 16/144 |
| 2,649,606 | 8/1953 | Fadner | 15/323 |
| 2,754,991 | 7/1956 | Hagerty et al. | 220/18 |
| 2,779,432 | 1/1957 | Meyerhoefer | 15/323 X |
| 2,920,337 | 1/1960 | Smith | 15/323 |
| 4,827,564 | 5/1989 | Brown | 16/18 R |
| 4,845,793 | 7/1989 | Meyer | 15/328 |
| 5,071,012 | 12/1991 | Jailor | 211/70.6 X |

FOREIGN PATENT DOCUMENTS 617564  8/1935  Germany ............................. 15/323

OTHER PUBLICATIONS

"Miller Sales Catalog" Spring Issue 1980 p. 79.
Maxi-Vac Sales Literature copyrighted 1984 for "Wet/Dry Vacs by Bissell" Form 803.
Maxi-Vac Sales Literature copyrighted 1971 for "Rol-l-E-Z-Caddy".

Primary Examiner—Chris K. Moore

[57] ABSTRACT

The present invention relates to the storage of vacuuming accessories upon a vacuum cleaner particularly a utility type cleaner. A unique structure is taught whereby the tubular portion of the accessory is telescopingly placed over a post-like structure or within a walled cavity each having at least three sides. In the post-like structure, the three sides are joined one to the other by curved sections each of which tangentially engage the inside surface of the accessory's tubular section. Similarly in the walled cavity structure, the outside surface of the accessory's tubular portion tangentially engages the inside surface of each cavity wall.

21 Claims, 4 Drawing Sheets

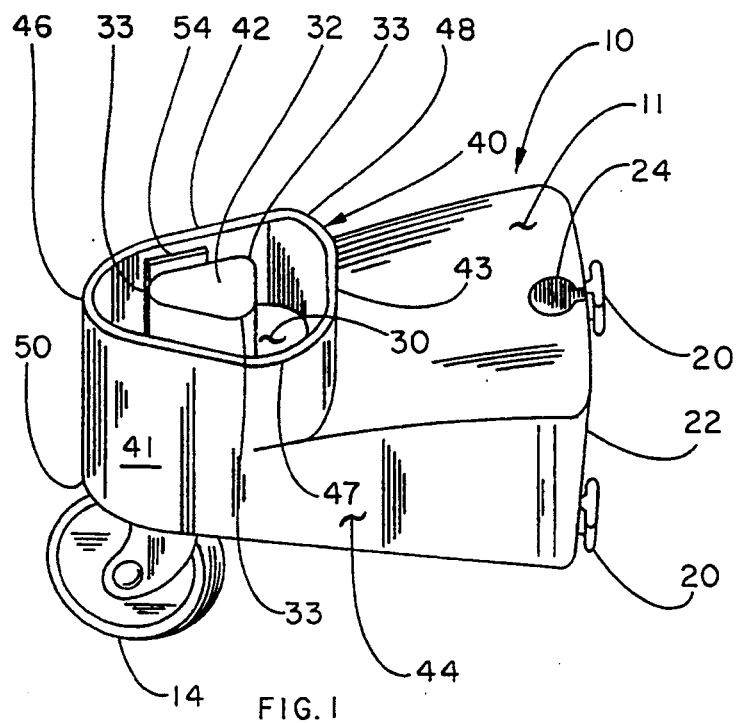
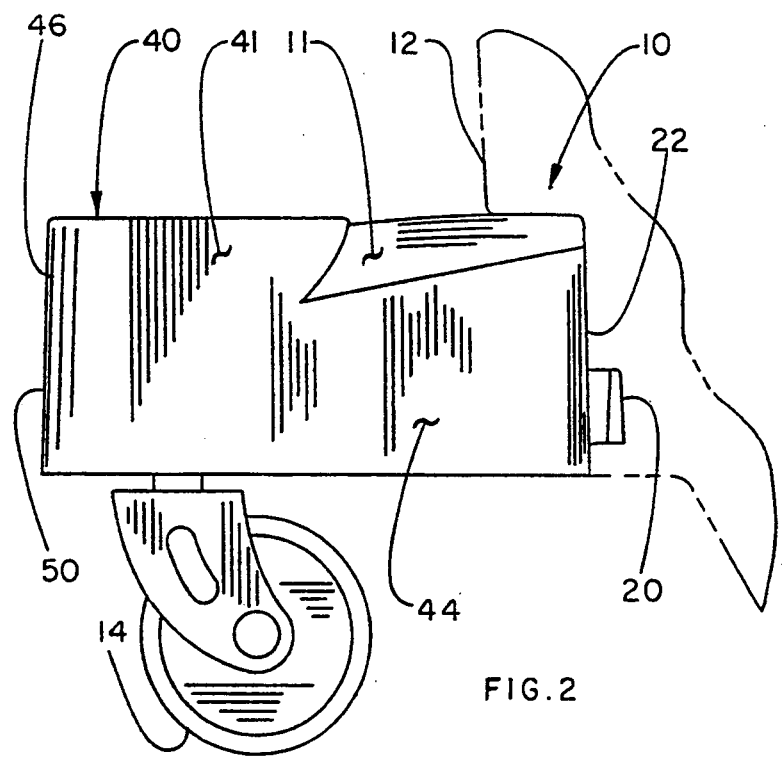

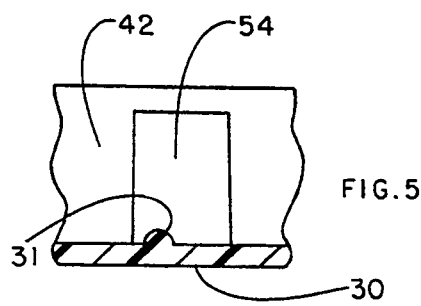
FIG. 5
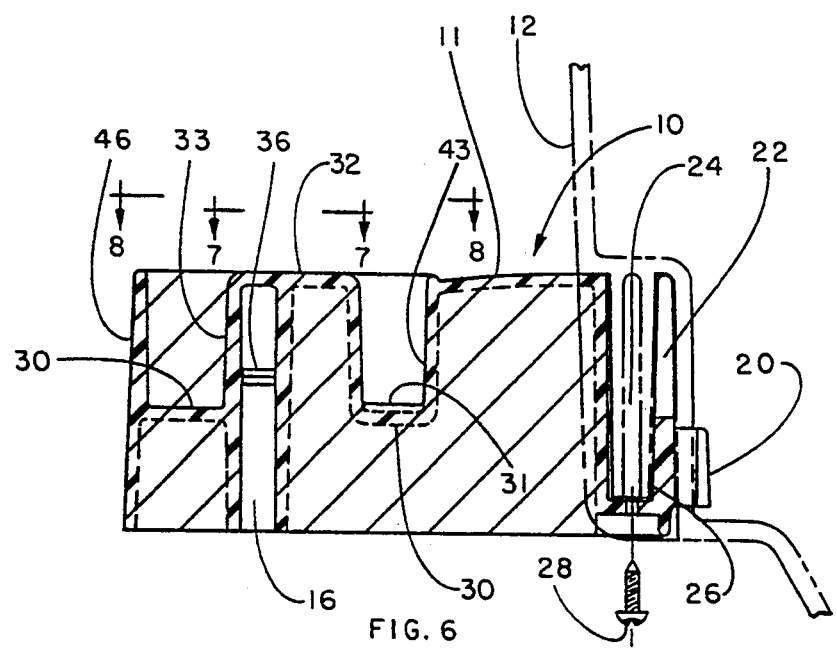
FIG. 6
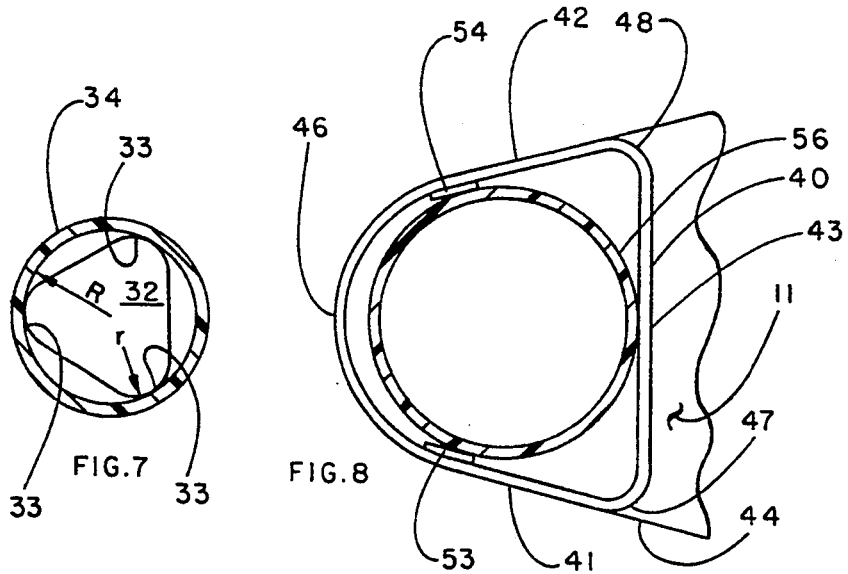
FIG. 7
FIG. 8

ACCESSORY STORAGE FOR A VACUUM CLEANER

BACKGROUND OF THE INVENTION

The present invention specifically relates to an improved castered wheel support typically used with a tank type utility vacuum cleaner, particularly an outrigger wheel support upon which vacuum accessories such as extension wands and/or other vacuuming tools may be stored when not in use. However, the invention taught herein may be used in other vacuum cleaner applications.

Heretofore utility vacuum cleaners have provided vertically directed cylindrical sections which are configured to receive the vacuuming accessories either telescopingly inside the section or circumscribing the external periphery of the section. Typical of such structures is the teaching of U.S. Pat. No. 4,827,564 issued on May 9, 1989, titled "Wheel Caster Frame" to William J. Brown; and U.S. Pat. No. 2,825,087 issued on Mar. 4, 1958, titled "Support for Vacuum Cleaner Accessories" to Carl E. Meyerhoefer.

A typical problem presenting the user of such prior art accessory storage means is frictional binding between the cylindrical section and the tubular section of the accessory caused by the full 360° surface to surface contact between the cylindrical section and the accessory.

SUMMARY OF THE INVENTION

The present invention provides an improvement for the above telescoping type of vacuum accessory storage devices. By the present invention a flat sided vertically standing hollow section is provided, preferably having a generally triangular cross-sectional plan form, whereby the tubular section of the vacuum accessory is telescopingly received therein. The triangular section is appropriately sized such that the inside circumscribing circle, tangent to each of the three vertical sides or walls, is approximately equal to the outside diameter of the accessories' tubular portion. Thus line contact is achieved between the outside perimeter of the accessory and the inside surface of each upstanding wall of the triangular section thereby securing the tubular portion of the accessory therebetween.

Although it is preferred to employ a three sided configuration generally forming a triangular plan form, it is to be considered within the scope and teaching of the present invention to alternatively employ four, or more upstanding walls thereby forming a square, pentagonal, hexagonal or octagonal etc. plan form.

A second embodiment of the present invention comprises a three sided post generally having a triangular cross-section preferably with rounded apexes. The rounded apexes define a circumscribing circle having a diameter equal to the inside diameter of an associated vacuum accessory tubular portion such that the triangular post is telescopingly received within the tubular portion of the accessory. Although it is preferred that the rounded apexes of the triangular post are configured such that line contact is provided between the rounded apex and the inside periphery of the accessories' tubular portion it is within the teaching of the present invention to provide for a limited surface to surface contact extending throughout a limited arc length of the rounded apex if desired.

Although it is preferred to employ a three sided post generally forming a triangular cross-sectional plan form, it is to be considered within the scope and teaching of the present invention to alternatively employ four, or more sides thereby forming a square, pentagonal, hexagonal, octagonal etc. plan form.

These and other objects and advantages of the present invention will become apparent from the following description.

BRIEF DESCRIPTION OF THE DRAWINGS

FIG. 1 is a left side perspective view of a castered outrigger wheel support embodying the present invention.

FIG. 2 is a left side elevational view of the castered wheel support as illustrated in FIG. 1.

FIG. 5 is an elevational view taken along line 5—5 of FIG. 3.

FIG. 6 is a cross-sectional view taken along line 6—6 of FIG. 3.

FIG. 7 is a plan view taken along line 7—7 of FIG. 6 illustrating an accessory tubular portion in frictional engagement with a storage post in accord with the present invention.

FIG. 8 is a plan view taken along line 8—8 of FIG. 6 (with the storage post removed) showing an accessory tubular portion in frictional engagement with the triangular side walls in accord with the present invention.

DETAILED DESCRIPTION OF THE INVENTION

Figure 3:
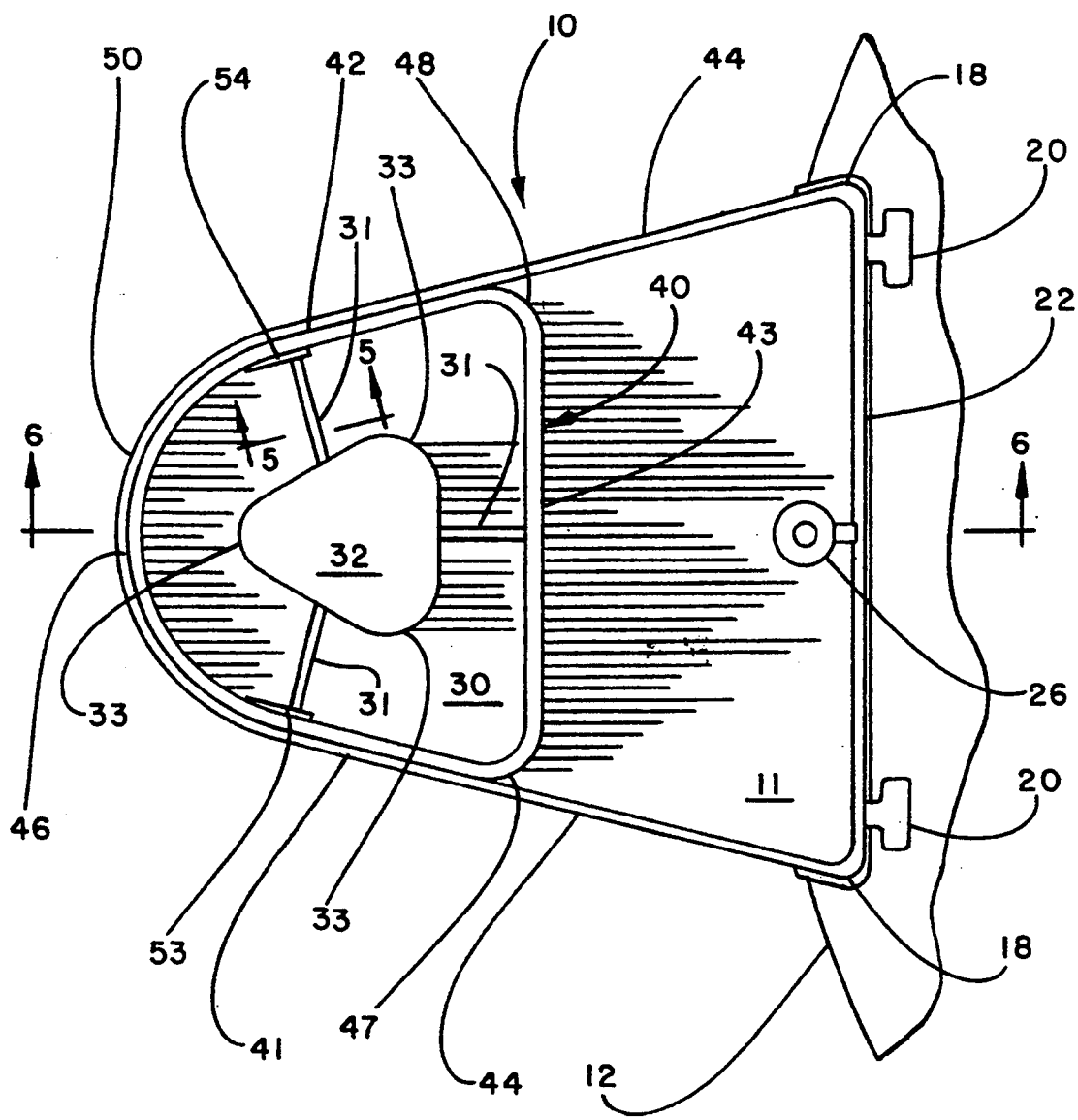
FIG. 3 is a top plan view of the castered wheel support of FIG. 1.
Figure 4:
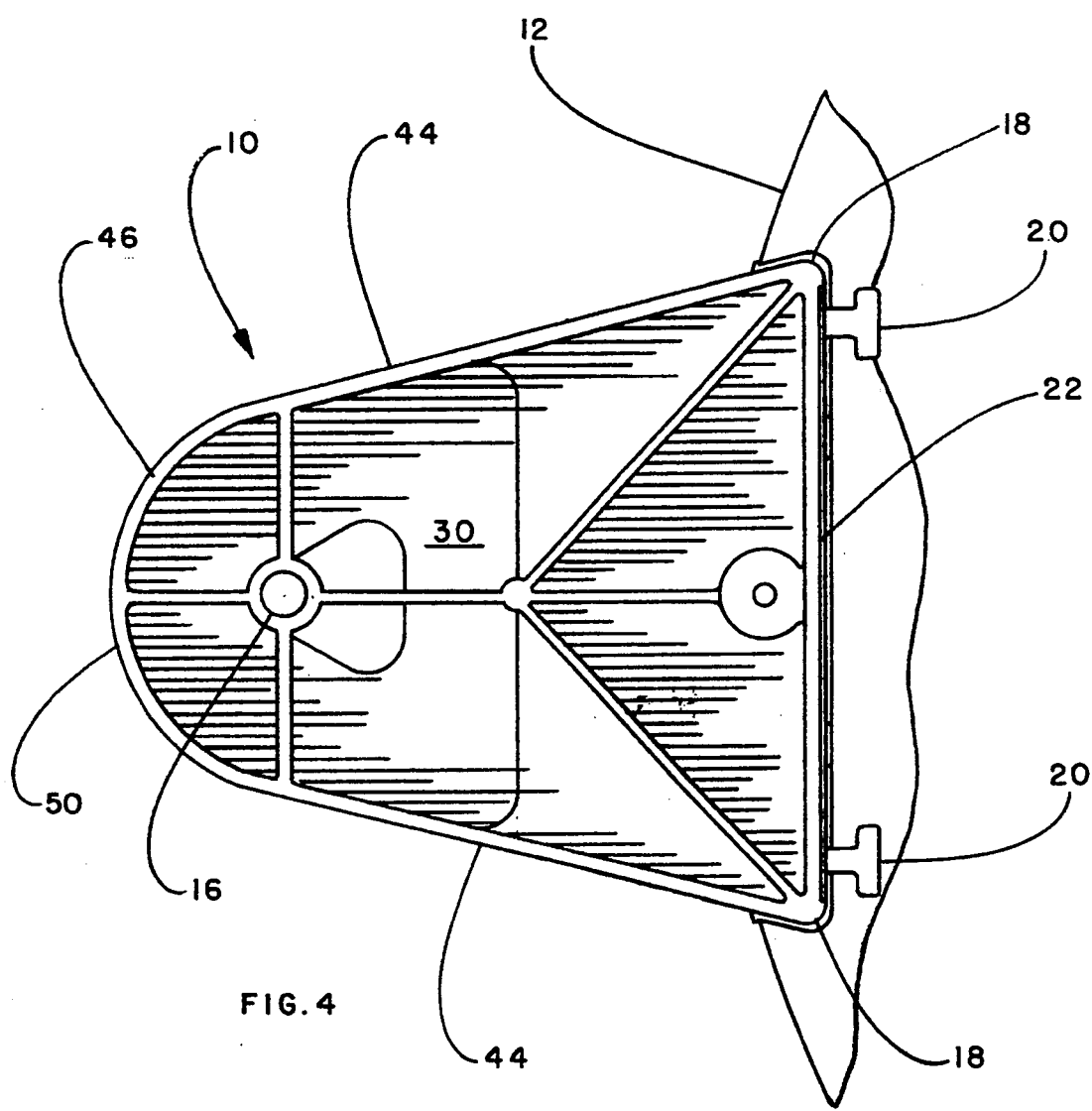
FIG. 4 is a bottom plan view of the castered wheel support of FIG. 1, with the castered wheel assembly removed, showing the preferred internal structural supports therein.

Referring now to the figures, a castered outrigger wheel support 10 is taught particularly for use on a tank type utility vacuum cleaner 12 (partially shown), or any other desired appliance. The wheel support 10 is typical of those used in the utility vacuum cleaner industry having a typical castered wheel assembly retained within pilot hole 16. Wheel support 10 may be typically attached to the vacuum cleaner tank 12 by tongue and groove means 18, as shown in FIGS. 3 and 4, plus interconnecting "T" shaped tangs 20 integral with and protruding from the wheel support rear wall 22 and interconnecting with correspondingly configured slots in tank 12. Also typically aiding attachment of wheel support 10 to tank 12 is post 24 integrally formed with tank 12 for receipt within bore 26. A screw 28 threaded into post 24 typically secures wheel support 10 to tank 12.

Located within wheel support 10 and below the top surface 11 thereof is a horizontal flat floor 30 from which triangular post 32 rises. Referring now particularly to FIG. 7, post 32 is provided rounded corners 33 (triangle apex). The radius r of rounded corners 33 is significantly less than the inside radius R of the tubular portion 34 of the vacuum accessory (not shown). Thus only line contact exists between rounded corners 33 and the inside periphery of tubular portion 34. Although only line contact is preferred between post 32 and tubular portion 34, the corners 33 may be elliptically configured (or any other suitable curve) thereby providing a limited surface to surface area contact (not shown) between the inside periphery of tubular portion 34 and rounded corners 33. It is preferred that the cross-section of post 32 is that of an equilateral triangle; however, it may be desired to provide other than an equilateral triangular cross-sectional configuration whereby the tubular portion 34 may be distorted or elastically stretched or distorted to fit over post 32 thereby increasing the frictional normal force between corners 33 and tubular portion 34 thereby increasing the "holding power" of post 32.

Positioned within one corner 33, as best seen in FIGS. 4 and 6, is pilot hole 16 for receiving therein the shaft (not shown) of caster wheel assembly 14. Thus pilot hole 16 receives structural support from floor 30 and the triangular configuration of post 32 integral therewith. Pilot hole 16 is typically provided with a circumferential collar section 36 for retention of caster wheel assembly 14.

Spaced apart from and generally surrounding triangular post 32 is a triangularly configured section 40 comprising walls 41, 42, and 43 extending vertically from floor 30; walls 41 and 42 are preferably configured to continue and blend into the support side walls 44. Similar to post 32 triangularly configured walls 41, 42, and 43 have rounded corners or apexes 46, 47, and 48. Rounded corner 46, as best seen in FIGS. 1 and 3, smoothly blends into and continues the nose curvature 50 of wheel support 10. Alternatively rounded corners 46, 47, and 48 may be eliminated thereby providing three (or more) separate upstanding walls.

Preferably positioned on the inside surface of tool support walls 41 and 42 are friction pads 53 and 54 respectively. The combined walls 41, 42, and 43 and friction pads 53 and 54 are cooperatively configured to receive therein, as particularly shown in FIG. 8, the tubular portion 56 of a vacuum accessory (not shown). The outside periphery of tubular portion 56 is telescopingly received within tool support 40 such that line contact is made between the outside periphery of tubular portion 56, rear wall 43, friction pad 54 and friction pad 53. Although line contact between tubular portion 56 and friction pads 53, 54 and rear wall 43 is preferred, it may be desired, in certain circumstances, to provide a concave surface to the exposed face of friction pads 53 and 54 and possibly to the inside surface of rear wall 43 at the point of contact with tubular portion 56 thereby providing a limited concave surface to surface area contact between friction pads 53, 54, rear wall 43 and the tubular portion 56.

Although no friction pad is illustrated herein on rear wall 43, it is considered within the scope of the present invention to include a friction pad thereon if desired. Further, although the preferred embodiment as taught herein includes friction pads 53 and 54 on the inside surface of walls 41 and 42, it is also considered within the scope of the present invention to remove friction pads 53 and 54 thereby providing a smooth inside wall surface for walls 41 and 42 similar to wall 43.

Still further it is considered within the scope of the present invention to structurally configure tool support 40 such that the wall 43 and particularly walls 41 and 42 yieldingly deflect outwardly upon receipt of tubular portion 56 therein thereby grippingly retaining tubular portion 56 therebetween.

Positioned upon and rising slightly above floor 30 are at least three ribs 31. In the event the user places a wand (not shown) within section 40 or upon post 32 and the wand is fluidly connected to the vacuum suction port via a flexible hose, ribs 31 provide an air passage between floor 30 and the wand thereby preventing a sealed suction condition if the vacuum cleaner is operating.

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

We claim:

1. In a castered wheel support used to support thereon a tank type utility vacuum cleaner wherein said wheel support includes vacuuming accessory storage means, the improvement wherein said storage means includes a plurality of vertically extending walls, said walls cooperating to form an open ended enclosure for removably receiving therein the tubular portion of a first vacuum cleaning accessory, whereby said tubular portion of said first accessory, when received within said enclosure, tangentially engages at least three of said walls thereby making line contact with said walls; said storage means further including a vertically extending post for telescopingly receiving thereon the tubular portion of a second vacuum cleaning accessory, said post having at least three vertically extending sides, said sides joined one to the other by convex surfaces whereby the inside surface of said second tubular portion tangentially engages said convex surfaces thereby making line contact therebetween.

2. The improvement as claimed in claim 1 wherein at least three of said walls are planar walls.

3. The improvement as claimed in claim 1 wherein said sides are planar.

4. The improvement as claimed in claim 1 wherein said post is axially aligned and positioned within said open ended enclosure.

5. The improvement as claimed in claim 1 wherein said post includes a pilot hole for securing thereto a castered wheel assembly.

6. The improvement as claimed in claim 5 wherein said pilot hole is positioned at the junction of two of said sides.

7. In an outrigger castered wheel support used to support a tank type canister vacuum cleaner wherein said wheel support includes accessory support means the improvement wherein said support means includes a vertically extending three-sided triangularly shaped post wherein the triangle apexes define a circumscribing circle having a given diameter whereby said vacuum cleaning accessory, having an internal diameter approximate said circle diameter, may be telescopingly placed upon said post thereby frictionally engaging said triangle apexes.

8. The castered wheel support as claimed in claim 7 wherein said post sides are joined one to the other by a plurality of convex surfaces, said convex surfaces tangentially engaging said accessory internal diameter thereby making line contact therewith.

9. The castered wheel support as claimed in claim 8 wherein said convex surfaces engage said accessory's internal diameter throughout an arcuate angle.

10. In an outrigger castered wheel support used to support thereon a tank type canister vacuum cleaner wherein said wheel support includes accessory support means for the storage of vacuum cleaning accessories thereon the improvement comprising three vertically extending side walls forming a hollow triangularly shaped open ended cavity defining an inscribed circle therein having a diameter whereby said vacuum cleaning accessory having an outside diameter approximately equal to said inscribed circle may be telescopingly received within said triangular cavity thereby frictionally engaging said side walls.

11. The castered wheel support as claimed in claim 10 wherein each of said side walls tangentially engage said accessory outside diameter thereby making line contact therebetween.

12. The castered wheel support as claimed in claim 11 wherein said side walls include contact pads projecting from at least one of said side walls, each said contact pad engaging said accessory outside diameter.

13. The castered wheel support as claimed in claim 12 wherein said contact pad includes a concave curved surface having a configuration approximating the outside configuration of said accessory for frictional engagement therewith.

14. Accessory storage means for use with a vacuum cleaner said means including a three-sided triangularly shaped post wherein the triangle apexes define a circumscribing circle having a given diameter whereby a vacuum cleaning accessory having an internal diameter approximately equal to said circle diameter may be telescopingly placed upon said post thereby frictionally engaging said triangle apexes.

15. The storage means as claimed in claim 14 wherein said post sides are joined one to the other by a plurality of convex surfaces said convex surfaces tangentially engaging said accessory's internal diameter thereby making line contact therewith.

16. The storage means as claimed in claim 15 wherein said convex surfaces engage said accessory internal diameter throughout an arcuate angle.

17. Accessory storage means for use with a vacuum cleaner, said means including at least three vertically extending side walls, said walls forming a hollow triangularly shaped cavity defining an inscribed circle therein having a given diameter whereby a vacuum cleaning accessory having an outside diameter approximately equal to said inscribed circle may be telescopingly placed within said triangular cavity thereby frictionally engaging said side walls.

18. The storage means as claimed in claim 17 wherein each side wall tangentially engages said accessory outside diameter thereby making line contact therebetween.

19. The storage means as claimed in claim 18 wherein said side walls include contact pads projecting from at least one of said side walls, each said contact pad engaging said accessory's outside diameter.

20. The storage means as claimed in claim 19 wherein each of said contact pads includes a concave surface having a configuration approximating a portion of the outside configuration of said accessory for frictional engagement therewith.

21. The storage means as claimed in claim 19 wherein at least one of said contact pads tangentially engages the outside surface of said vacuum cleaning accessory thereby making line contact therewith.

* * * * *